United States Patent

[11] 3,627,569

[72] Inventor David Beecham
Allentown, Pa.
[21] Appl. No. 787,497
[22] Filed Dec. 27, 1968
[45] Patented Dec. 14, 1971
[73] Assignee Bell Telephone Laboratories, Incorporated
Murray Hill, N.J.

[54] DEPOSITION OF THIN FILMS WITH CONTROLLED THICKNESS AND PLANAR AREA PROFILE
8 Claims, 4 Drawing Figs.

[52] U.S. Cl. .... 117/106 R, 117/106 A, 117/107
[51] Int. Cl. .... C23c 11/00
[50] Field of Search .... 117/106, 106 A, 107; 118/48, 49, 49.1, 49.5, 50, 50.1

[56] References Cited
UNITED STATES PATENTS

| | | | |
|---|---|---|---|
| 2,445,310 | 7/1948 | Chilowsky | 118/49 X |
| 2,793,609 | 5/1957 | Tzu En Shen et al. | 118/49 |
| 3,446,936 | 5/1969 | Hanson et al. | 118/49.1 |

*Primary Examiner*—Alfred L. Leavitt
*Assistant Examiner*—William F. Ball
*Attorneys*—R. J. Guenther and Arthur J. Torsiglieri

ABSTRACT: The specification describes a method and apparatus for vapor deposition of thin films in which the thickness profile and planar area of the film is highly controlled through the use of a collimating device. The collimating device consists of a plurality of elongated open-ended passages for "channeling" the evaporant between the source and the substrate. This produces an even distribution of vapor and high directivity as the depositing material reaches the substrate. The invention is especially suitable for the production of large area films applicable, for instance, to large piezoelectric transducers. The invention is also applicable to the production of films to any given thickness profile.

INVENTOR
D. BEECHAM
BY
A. J. Torsiglieri
ATTORNEY

DEPOSITION OF THIN FILMS WITH CONTROLLED THICKNESS AND PLANAR AREA PROFILE

This invention relates to a method and apparatus for evaporating thin films.

With the recent emphasis on microcircuit technology the problem of thickness uniformity of deposited thin films has become less critical in view of the small dimensions of the film. It is relatively easy to control the thickness of a film a few square mils in diameter to within acceptable limits. As the lateral dimensions of the film are increased the thickness of the film becomes less uniform due to inherent limitations of the apparatus. A source placed a few inches from a 50 mil square substrate will approximate a zero area source and the deposited film will be of uniform thickness. But if the film is to be deposited over a few square inches the source must be several feet away to approach a uniformity comparable to that so easily obtained for the microsubstrate.

Although less dramatic than the thin-film applications, important applications do exist for films of large area. For instance, arrays of electroluminescent devices for visual displays may, in certain cases, utilize large area semiconductor films. The present invention was specifically developed for large-area piezoelectric transducers. For certain specialized applications, transducers having areas of several square inches are required. This invention meets this need as well as others which may occur in the art.

Control over thickness uniformity is obtained according to the invention by using a collimating device to control the direction of flow of material between the source and the substrate. The collimating device consists of a plurality of confined passageways placed between the source and the substrate. It has been both experimentally and theoretically demonstrated that films produced with such a collimating device show greater uniformity in thickness than those produced with conventional line or large area sources.

An additional advantage of the use of the invention is that the vapor is incident on the substrate over a smaller range of angles than would be obtained from a conventional large area or line source giving the same thickness uniformity. This is of particular importance in establishing the direction of grain growth. In particular it enables large area transducers of exclusively shear and longitudinal mode to be deposited.

It is also possible to adapt the evaporating apparatus and collimating device to the deposition of tapered films. In connection with ultrasonic transducers the use of tapered films expands the bandwidth of the transducers. Tapered transducers can also be used for obtaining frequency dispersion and for reducing spurious resonances in crystal filters. When evaporation is carried out through a collimating device the fringe areas around the highly uniform film are controllably tapered. The extent and degree of taper can be controlled by adjusting the total geometry of the system, the dimensions of the collimating device and the wall temperature of the collimating device. The planar area shape will also be a function of the geometry and wall temperature. For example, a circular tube will yield a circularly-shaped deposit whilst a square tube will yield a square shaped deposit when their wall temperatures are below the condensation temperature.

These and other aspects of the invention will perhaps become more apparent from a consideration of the following detailed description: In the drawing.

Figure 1A:
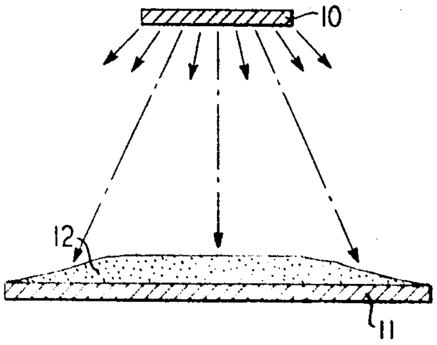
FIGS. 1A and 1B are schematic drawings illustrating the principle on which the invention is based.

FIG. 1A describes the evaporation profile from a small area source 10 onto substrate 11. The distribution of evaporant is approximated, according to Knudson's law, by the cosine squared curve shown. The resulting film is shown at 12 with the thickness nonuniformity exaggerated.

Figure 1B:
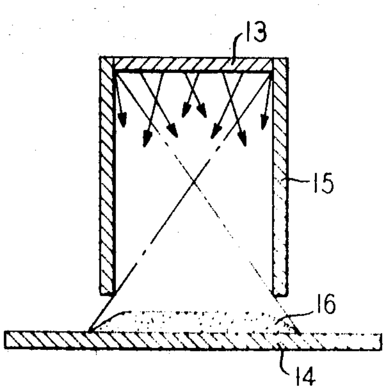

FIG. 1B illustrates the evaporation behavior of a similar source 13 and substrate 14 except that a cylindrical collimating tube 15 is added. The distribution of evaporant is radically altered largely because some of the vapor is intercepted by the walls of the tube and, depending on the wall temperature, either condenses permanently or reevaporates and so is rechanneled onto the substrate. The thickness profile of the film 16 is essentially uniform over the region corresponding to the tube diameter, but then has a tapered portion of extent dependent on the geometry and wall temperature. For example, if the walls are much cooler than the condensation temperature of the material then the walls can shadow part of the substrate completely from evaporated material. Tubes with walls above the condensation temperature will yield films having a much larger tapered area extending in theory over all the substrate. Thus by judicious choice of tube diameter, tube length, cross-sectional shape, tube wall temperature gradient and source to substrate distance films of any profile can be deposited. In particular in the context of this invention two cases arise. The first is when the tapered region is made small compared with the uniform region so that the addition of many such regions will yield a substantially planar region. The second is when the tapered region is made large enough to control the zone of the properties of a device made from the film.

Figure 2:
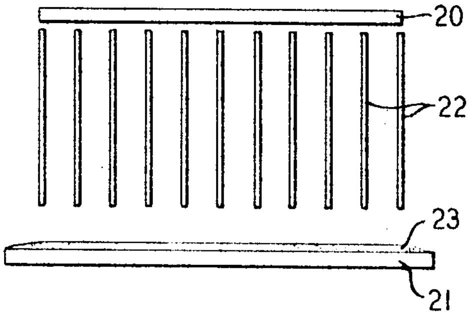
FIG. 2 is a schematic representation of an apparatus embodying the basic feature of the invention.

This principle is applied according to the invention to the deposition of thin films as illustrated in FIG. 2. The source 20 and substrate 21 are large in area. For the purpose of this invention a large area is defined as at least 1 square inch. A bank of collimating tubes 22 are disposed between the source and substrate. Each tube has the effect of promoting planar deposition over a localized region as described above in connection with FIG. 1B. When the tubes are closely spaced or, preferably, are separated by a single thin wall, the integrated effect is a highly planar film 23 of extremely uniform thickness.

To obtain a comparable result using the usual approximation of a source of small area would require a source to substrate distance of at least eight times the longest dimension of the substrate. In the case of a substrate 8 inches by one-fourth inch, i.e., two square inches in area, the required separation would be 64 inches. The inconvenient size prime an apparatus capable of accommodating this separation is a prime consideration. Additionally, with such a spacing only a small portion of the evaporant reaches the substrate and the waste is extravagant, or even prohibitive if the material being evaporated is expensive. Also the waste means that deterioration of the pump oils and accumulation of condensed material is large and maintenance costs are consequently high.

Thus, the use of the collimating device for producing planar uniform films in accordance with the invention is a distinctly useful expedient.

The collimating device will, in the usual case, comprise a plurality of confined passageways. The geometry of the collimating device can vary somewhat although it should still meet certain criteria. For example, the uniformity of the deposited film increases as the length to diameter rates increase and so from this viewpoint should be as large as possible. On the other hand a large length to diameter ratio means a higher back pressure and slower deposition rate. It also increases the amount of material condensed out on the tube wall if it is below the condensation temperature and necessitates a more powerful heater if the tube walls are to be kept at a specified temperature. Thus a compromise has to be effected, the ratio normally being between 4 and 20.

It is apparent that the cross section of the collimating bank should present a maximum area of active-evaporating surface. From this standpoint, a theoretically optimum array (neglecting wall thickness) is a close-packed polygon array which has a nonvoid space limited only by the wall thickness. The likely polygon configurations are close-packed squares, triangles or hexagons (honeycomb). By contrast a square array of round tubes inherently includes more than 20 percent void space although this may be reduced to less than 11 percent by using a hexagonal close-packed array. The wall thickness is usually a more limiting factor. For instance, for a typical case in which the wall dimension is 30 mils and the array is a close-packed array of square passages employing ¼-inch squares the void space due to the wall is over 20 percent. But the same wall size is a two dimensional close-packed array of round tubes gives twice the void space. As a general criterion from the standpoint of avoiding perturbations in the thickness uniformity of the film, the void area of the collimating section should be less than 50 percent of the total area. Thus, although it is somewhat arbitrary, an additional standard can be set on the maximum size of each passageway to put the collimating device within the inventive context. For this purpose a useful maximum on the cross-sectional area of each passageway is one-half inch$^2$.

The following examples are given as exemplary of useful operating conditions.

Example I

The object of this illustrative embodiment is to deposit a large area planar film of cadmium sulfide. (Other materials of interest in connection with semiconductor thin films and which can be treated in a similar manner are zinc sulfide, zinc oxide, lead sulfide, barium sodium niobate, and potassium sodium niobate. Also of interest are metal films such as gold, silver, aluminum, nickel, etc.) The substrate used was a fused quartz plate having dimensions of 6.5 inches by 0.75 inch by 1 inch and a polished optically flat surface on the 6 inches by 0.75 inch face. The source was a rod of cadmium sulfide surrounded by a heating coil with provision for adding sulfur to achieve proper stoichiometry in the film. The source ingredients are conveniently contained in a fused quartz box with a slit opening or other conventional arrangement. The source temperature was about 1,000° C. The collimating device comprises a row of fused quartz passages of square cross section with ¼-inch sides. The wall thickness between openings was 30 mils. A bank of thirty six passages each of which is two inches long and spaced 4 and ½-inches from the substrate gave a film uniform to within 1 percent over a 6.0 inch by 0.25 inch area. The number of passages can be multiplied in the 0.25 inch direction to yield wider uniform thickness film. It is to be expected that deposition onto a larger substrate would yield film with 1 percent uniformity up to 8.0 inches by 0.25 inch.

Ultrasonic measurements showed that films could be grown with the direction of growth of the C-axis of the CdS in a predominantly controlled direction from normal to the substrate up to 50° from the normal. Thus large area predominantly shear and longitudinal mode transducers were produced.

The length and the radius of the collimating passages were varied over wide ranges to determine effective operating conditions. Based on these results it was concluded that the ratio of the length to the smallest lateral dimension of the passageway should exceed four to produce a good collimating effect. However, this ratio should not appreciably exceed 40 to avoid blocking of the tubes due to condensation. The distance from the collimating tubes to the substrate is relatively unimportant since the material leaving the tubes is quite directional. In some cases this distance will depend upon the amount of heating the substrate can tolerate due to its proximity to the source and the heated bank of tubes. Completely satisfactory results were obtained with this spacing exceeding twice the length of the passages.

The collimating device can be composed of any material not adversely affected by the thermal or chemical environment. For the deposition of the usual thin film materials, fused quartz, platinum, or rhodium can be used.

It has been found in many cases the condensation on the internal surface of the walls of the passages limits the effectiveness of the collimating device and in some cases, especially where the passage is long and narrow, the passage may become blocked. Studies have shown that the material condenses mostly in the upper region of the passage, that is, the region closest to the source. This defect can be cured by heating the collimating device, especially those regions closest to the source. This results in a secondary evaporation and eliminates excessive condensation at one place. Heating the collimating device to a temperature in excess of the condensation temperature is most effective, although any degree of heating will reduce condensation on the walls. In the procedure of example I, heating the upper ends of the passages to a temperature in excess of 500° C. was found to be beneficial.

Example II

Figure 3:
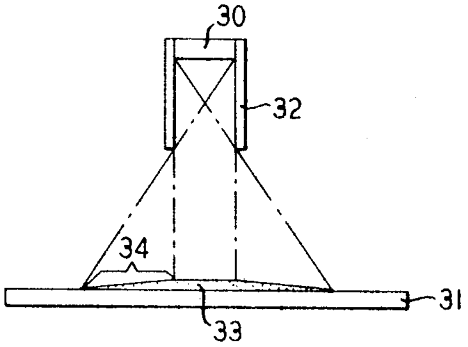
FIG. 3 is a schematic representation of the apparatus designed for the deposition of tapered films.

The deposition of tapered films will be described in connection with FIG. 3. The evaporation process is effected in the same manner as before. A single collimating passage, which in this is a tube, is shown at 32. The source 30 and substrate 31 are disposed as before. The deposited film 33 exhibits the characteristic planar portion corresponding to the area of the opening of the collimating device but also has a substantially tapered region 34 around the periphery of the planar region. It is evident that the degree of taper and the extent of the tapered region can be controlled by varying the length-to-diameter ratio of the tube and the spacing between the end of the tube and the substrate. The shape of the planar area of the deposited films will also be a function of the shape of the tube and the tube wall temperature as mentioned previously. It is also evident that a matrix of such tubes can be fed from a common vapor source to yield on the substrate a corresponding matrix of tapered films. Thus use of this invention can lead to simultaneous production of many similar devices with consequent reduction in cost and increase in production control.

It is evident that the foregoing methods have general application to the vapor deposition of thin films of a wide variety of materials for many different applications. However, as indicated previously, they are considered to have special significance in connection with the manufacture of piezoelectric transducers or filters. The materials most suitable for thin films produced in this connection are zinc sulfide, cadmium sulfide, zinc oxide, potassium sodium niobate, and barium sodium niobate.

What is claimed is:

1. A method of depositing a thin film by vapor deposition which comprises mounting a substrate on which the film is to be deposited and a source of evaporant in a confined chamber, heating the evaporant to vaporize the source material and maintaining a temperature difference between the source and substrate to as to effect mass transfer of the source material to the substrate, the improvement which comprises locating a collimating device between the source and the substrate so that essentially all of the material being transferred from the source to the substrate encounters the collimating device, the collimating device comprising a plurality of close-packed, elongated, passages having regular cross sections for channeling the evaporant unidirectionally onto the substrate so that the thickness of the film deposited on the substrate exhibits greater uniformity than it would in the absence of the collimating device.

2. The method of claim 1 applied to the deposition of a film having a high degree of thickness uniformity.

3. The method of claim 1 applied to the deposition of a film having a tapered thickness.

4. The method of claim 1 applied to the deposition of a film having both a uniform and tapered region.

5. The method of claim 1 wherein the evaporant is a piezoelectric material selected from the group consisting of zinc sulfide, cadmium sulfide, zinc oxide, potassium sodium niobate, and barium sodium niobate.

6. The method of claim 1 further including the step of heating at least part of the collimating device to prevent premature or unwanted condensation.

7. The method of claim 1 with the cross-sectional area and wall temperature of the passages in the collimating device chosen to yield a film of the desired surface area shape.

8. The method of claim 1 in which the evaporant is transferred along a passage having a line of sight between the source and the substrate, and in which the area of the substrate exposed to the evaporant is at least 1 square inch.

* * * * *